United States Patent [19]

Stammreich et al.

[11] Patent Number: 4,906,037
[45] Date of Patent: Mar. 6, 1990

[54] EXTERNALLY ACCESSIBLE, CLUTCHING ADJUSTABLE KEEPER MECHANISM

[75] Inventors: John C. Stammreich, Rancho Palos Verdes; William Bourne, Jr., Redondo Beach; Raymond Harmon, Orange, all of Calif.

[73] Assignee: V.S.I. Corp., Chantilly, Va.

[21] Appl. No.: 325,084

[22] Filed: Mar. 17, 1989

Related U.S. Application Data

[63] Continuation of Ser. No. 94,243, Sep. 8, 1987, abandoned.

[51] Int. Cl.$^4$ ............................................. E05B 15/02
[52] U.S. Cl. .............................. 292/341.18; 74/567; 292/DIG. 60
[58] Field of Search ............... 292/341.18, 341.19, 292/341.13, DIG. 31, 113, DIG. 60; 411/6, 7, 9, 10, 11; 74/567, 569

[56] References Cited

U.S. PATENT DOCUMENTS

| | | | |
|---|---|---|---|
| Re. 31,935 | 7/1985 | Poe | 292/113 |
| 1,083,438 | 1/1914 | Dohse | 292/112 |
| 2,876,031 | 3/1959 | Claude-Mantle | 292/112 |
| 2,913,273 | 11/1959 | Claud-Mantle | 292/246 |
| 2,916,901 | 12/1959 | Claude-Mantle | 292/112 |
| 2,939,734 | 7/1960 | Claude-Mantel | 292/112 |
| 3,490,307 | 1/1970 | Jetter | 74/425 |
| 4,053,177 | 10/1977 | Stammreich et al. | 292/DIG. 31 |
| 4,162,592 | 7/1979 | Taniwaki | 292/112 |
| 4,478,446 | 10/1984 | Duran | 292/341.18 |
| 4,602,812 | 7/1986 | Bourne | 292/DIG. 60 |
| 4,609,314 | 9/1986 | Metz | 411/7 |
| 4,682,800 | 7/1987 | Lovelace | 292/247 |
| 4,691,952 | 9/1987 | Harmon | 292/241 |
| 4,692,075 | 9/1987 | Metz | 411/7 |
| 4,707,007 | 11/1987 | Inon | 292/341.18 |

FOREIGN PATENT DOCUMENTS 0195503 12/1919 Canada .

OTHER PUBLICATIONS

Boeing Service Bulletin 767-71-0037, dated Sep. 5, 1988, revised Sep. 10, 1987, pp. 1 and 2.

Primary Examiner—Gary L. Smith
Assistant Examiner—Eric K. Nicholson
Attorney, Agent, or Firm—Poms, Smith, Lande & Rose

[57] ABSTRACT

An externally accessible, clutching adjustable latching mechanism is provided having an adjusting assembly which permits the latching mechanism to be mounted over a greater range of depths than conventional adjusting mechanisms and controls the amount of pre-load which is possible by the adjustment feature, and protects the aircraft skin from being damaged during such adjustment. An internal clutching mechanism insures the accomplishment of proper, minimum preload on the structures connected by the latching mechanism. The adjusting assembly includes a two-part driver (14a, 14b) and a drive unit (15) which translates rotational movement of the driver into linear movement of a connecting element (10), allowing infinitely small, non-incremental adjustment of the position of the connecting element (10) relative to the structures joined by the mechanism. The driver further includes clutching plates (36, 39) and springs (72) which provide a disengaging feature when a pre-selected pre-load has been achieved as a result of adjustment of the connecting element. The disengagement prevents any additional pre-load from being applied to the structures by the rotation of the mechanism.

18 Claims, 3 Drawing Sheets

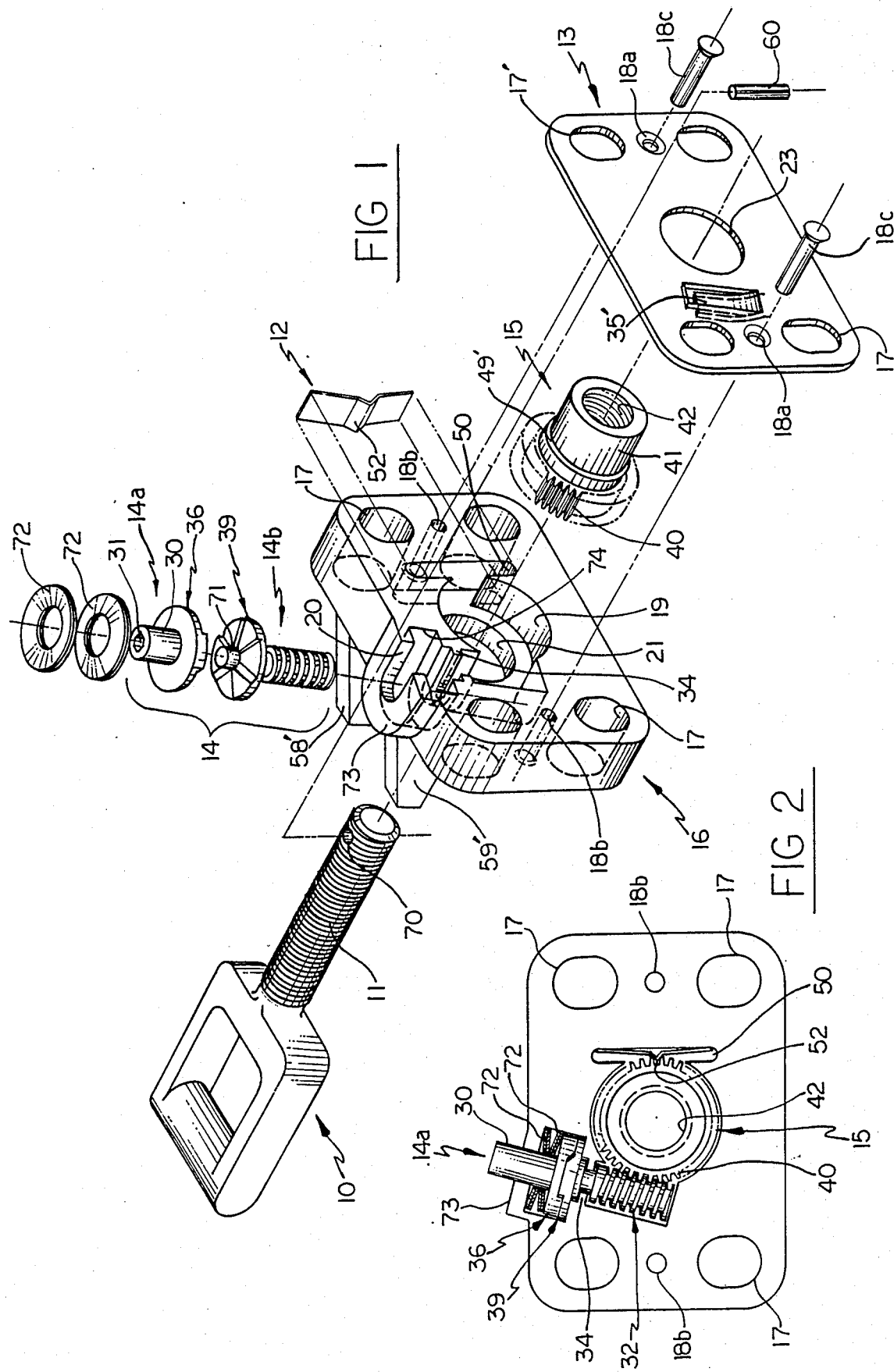

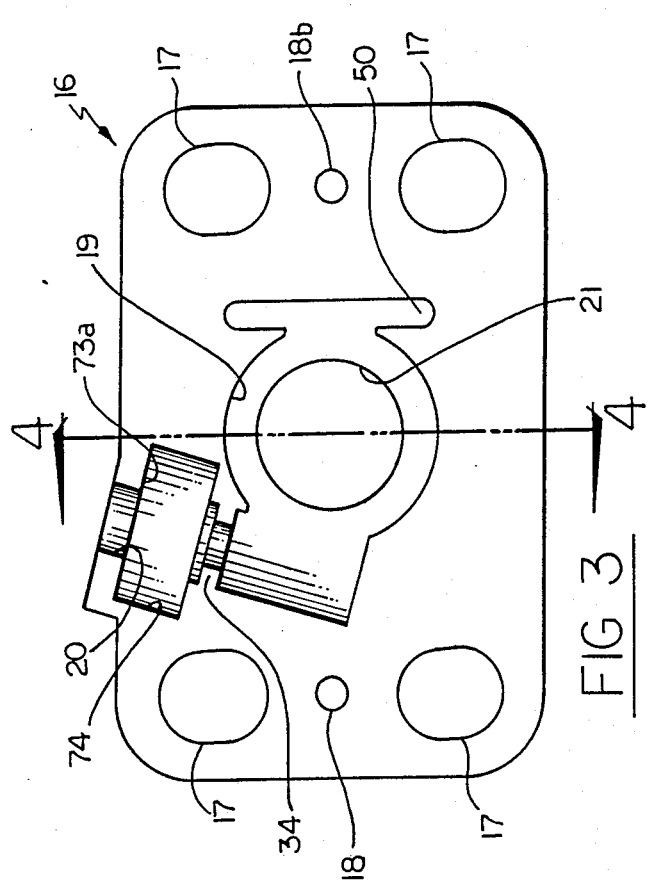
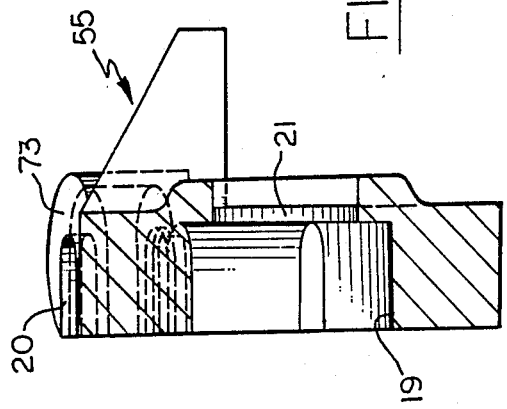
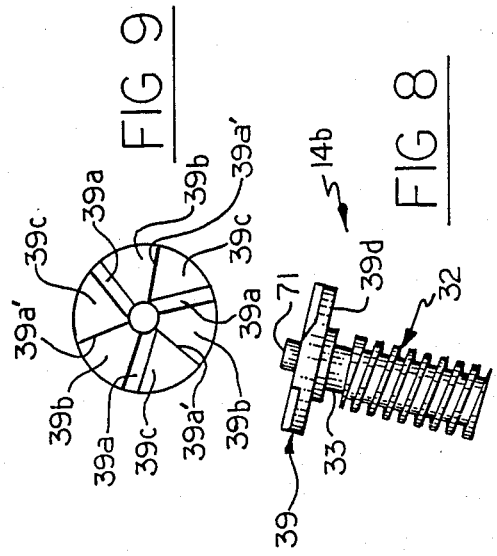
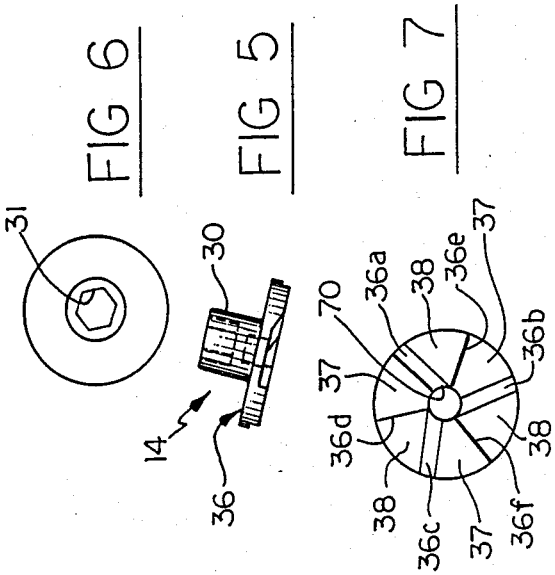

EXTERNALLY ACCESSIBLE, CLUTCHING ADJUSTABLE KEEPER MECHANISM

This is a continuation of co-pending application Ser. No. 07/094,243 filed on 09/08/87, now abandoned.

CROSS-REFERENCE TO RELATED APPLICATION

Copending application of Raymond E. Harmon et al., U.S. Ser. No. 07/019,913 filed Feb. 27, 1987 for "Externally Accessible Adjustable Keeper Mechanism", having common ownership with the present application, now U.S. Pat. #4852923.

TECHNICAL FIELD

The present invention relates to mechanisms which permit controlled adjustment of the position of the mechanism relative to the structures joined by the mechanism. In particular the present invention is directed to latch mechanisms used to connect and secure two parts of an aircraft structure.

BACKGROUND

The prior art in latch technology teaches various ways by which a latch mechanism may be adjusted for optimum performance in its intended use. In almost all cases the adjustment feature is designed specifically for the particular latch mechanism and thus is useful only in that particular application.

The present invention is directed for use in variety of latch mechanisms, most notably in the hook latch and keeper type mechanisms. Its adaptability to more than a single application may be attributed to its structural components which are uniquely arranged to provide optimum performance in all aspects of the latching function, i.e., mounting parameters, manual adjustment, load application, repair and replacement of components, etc. The uniqueness and advantages provided by the invention which are not available from the prior art will be described and explained in detail in the description which follows.

SUMMARY OF THE INVENTION

The present invention is an adjustable latching mechanism which is used to secure structures together, e.g. two parts of an aircraft, and allow an adjustment in the connection therebetween while preventing any overloading of the structures as a result of the adjustment. The invention is an adjusting assembly which includes a clutching feature. The adjusting assembly includes a driver which is tool-operable from the exterior surface of the structures in which the mechanism is mounted. The end of the driver, opposite the tool operable end, has a meshing surface. This meshing surface engages with a meshing surface on the drive unit to effect rotation of the drive unit. The drive unit translates its rotational movement into linear movement of the connecting element threaded thereon. The connecting element is restrained from rotational movement by a mechanism which may be separate from the assembly and the connecting element. Further included in the adjusting assembly is the present invention which disengages upon achieving a pre-selected load between the connecting element and a latch for example, and prevents any further rotation of the drive unit thereby ceasing further adjustment of the load between the two structures.

A housing is provided which surrounds and contains the clutching mechanism and the interacting meshing surfaces of the driver and drive unit. Surfaces are constructed in the housing whereby the driver may be held in pre-determined alignment with respect to the drive unit.

Further details of the construction of the invention and the advantages gained thereby are disclosed in a description which follows and the accompanying drawings.

BRIEF DESCRIPTION OF THE DRAWINGS

FIG. 1 is an exploded view in perspective of a preferred embodiment of the present invention.

FIG. 2 is a plan view in elevation of one portion of the housing and showing a portion of the preferred embodiment for the invention assembled therein.

FIG. 3 is a plan view in elevation of the portion of the housing shown in FIG. 2.

FIG. 4 is a view in cross-section of what is shown in FIG. 3 as seen generally along line 4-4.

FIG. 5 is a view in elevation of the drive of the preferred embodiment of the present invention.

FIG. 6 is a top plan view of what is shown in FIG. 5.

FIG. 7 is a bottom plan view of what is shown in FIG. 5.

FIG. 8 is a view in elevation of the drive shaft of the preferred embodiment of the present invention.

FIG. 9 is a top plan view of what is shown in FIG. 8.

DETAILED DESCRIPTION OF A PREFERRED EMBODIMENT

Figure 10:
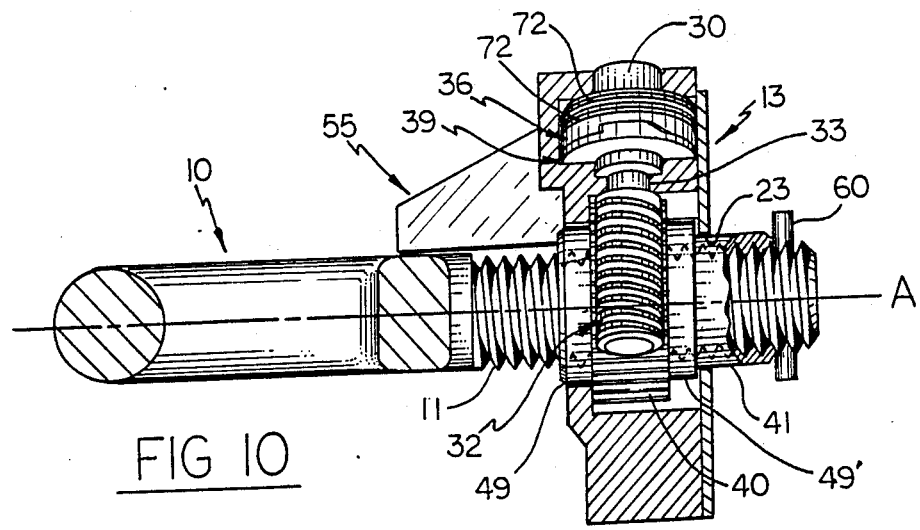
FIG. 10 is a view in cross-section of the assembled preferred embodiment shown in a first adjusted position.

In the drawings like reference numerals are used throughout the several views to indicate identical or like elements.

FIG. 1 illustrates in detail a preferred embodiment of the adjustable latching mechanism of the present invention. It should be noted that while a keeper-type mechanism is shown the invention is not limited solely to use in such applications. The invention may be adapted for use in the hook portion of a latching mechanism, as well as other types of mechanisms requiring the type of adjustment possible with the present invention.

The components of the preferred embodiment are a connecting element, e.g. a keeper, and an assembly for adjusting the position of the connecting element relative to the two structures which are being joined by the latch mechanism. The connecting element 10 may be, and is shown in the drawings as, a conventional keeper well known in the art. The connecting element has an externally threaded portion 11 for purposes to be explained hereinafter. The adjusting assembly includes a two-part driver 14 and a drive unit 15 which translates rotational movement into linear movement of the connecting element 10. The two-part driver is constructed to disengage and prevent further adjustment when a preselected preload is achieved.

The preferred embodiment includes a housing constructed for mounting to one of the structures which is to be secured by the latch mechanism. A first and major portion 16 of the housing is typically rectangular in shape and includes any selected number of openings 17 for permitting screws, bolts or other type of fastener (not shown) to be inserted therethrough for mounting the housing to a prepared surface on one of the structures (not shown). The rearward facing side of this portion 16 includes a recessed area 19, in this case substantially circular in shape. Included in the recessed area 19 is a wall or surface 19a which serves as a bearing or reacting surface during operation of the mechanism. Adjacent the recessed area 19, near its uppermost end, is an access opening 20. The access opening 20 accommodates a portion of the driver 14 to be explained hereinafter. The recessed area 19 also includes a centrally located through hole 21.

A second portion of the housing in the preferred embodiment is a cover 13. It is provided for closing the recessed side of the other housing portion 16. The cover 13 includes openings 17' situated for alignment with the openings 17 in the first portion 16 of the housing. The cover 13 also includes a centrally located opening 23 therein. This opening 23 serves as a guide and support for a portion of the drive unit 15 to be explained hereinafter. The cover 13 includes apertures 18a which align with mating openings 18b in the major portion 16 into which fasteners 18c are installed for fixing the cover 13 securely to the major portion 16 of the housing.

The housing 16,13 is constructed as explained above to surround and contain portions of the adjusting assembly. The adjusting assembly of the preferred embodiment includes two elements, i.e. a two-part driver 14 and a drive unit 15. spring means 12 may be used to supplementally restrain the drive unit and driver against inadvertent rotational movement. The adjusting assembly is unique in that it departs from the known tool-operated star-wheel constructions and provides a mechanism for preventing load adjustment beyond a predetermined amount. Specifically, the two-part driver 14 interacts with a drive unit 15 to effect adjustment of the latching mechanism. Adjustment is possible only until that moment when a pre-selected preload is achieved between the mechanism and the structures.

The driver 14 includes two parts a driving end portion 14a and a driven end portion 14b. The driving end portion 14a in the preferred embodiment has a shaft 30. At one end of the shaft 30 a tool engageable recess 31 is provided. At the opposite end of the shaft 30 is located a first clutching plate or surface 36. FIGS. 5, 6, 7 illustrate this component in greater detail. The clutching surface faces away from the component and includes a series of alternating cam or ramp surfaces 36a, 36b, 36c and vertical stop surfaces 36d, 36e, 36f in between which are alternating flat raised surfaces 38 and recessed surfaces 37. Centrally located in this surface 36 is a recess or counterbore 70. The purpose for each of these surfaces will be explained further hereinafter.

The driven end portion 14b of the driver also includes a shaft, a portion of which has a meshing surface 32, e.g. of threaded or tooth gear construction. Opposite the meshing surface 32 of the driven end portion 14b is a second clutching plate or surface 39. FIGS. 8 and 9 illustrate this component in greater detail. The clutching surface 39 is constructed so as to provide an alternating series of vertical wall surfaces 39a', raised flat surfaces 39b, cam or ramp surfaces 39a, and recessed flat surfaces 39c. In the center of the second clutching plate or surface 39 is a boss or finger 71 which is sized so as to fit within the counterbore 70 of the first clutching plate 36. Between the meshing surface 32 and the clutching plate 36 is a recessed area or groove 33.

A plurality of curved, spring washers 72 are provided at the tool engageable end of the driving portion 14a. The particular washer is selected by determining the maximum preload the mechanism is designed to achieve, and thus the amount of torque which will exist at this selected preload.

The housing 16 has an upper flange-like portion 73 which partially protrudes beyond the exterior of the housing and a free-standing support surface or rib 34 which is located between the access opening 20 in the portion 73 and the housing recessed area 19. In the preferred embodiment illustrated in FIG. 1 it can be appreciated that both the flange-like portion 73 and the rib 34 are u-shaped in order to accommodate portions of the driver 14. Between the rib 34 and flange-like portion 73 is a recessed area 74 formed integral thereto. The underside of the second clutching plate 39 includes a boss 39d which rests upon the top surface of the rib 34 with the meshing surface 32 extending partially into the housing recess area 19. In this manner the driver 14 is aligned in at least one direction relative to the drive unit 15. The clutching surfaces 36, 39 mate within the recessed area 74 with the springs 72 being contained between the flat opposite side 36g of the first clutching plate 14a and the internal surface 73a of the flange-like portion 73. A supplemental support surface 35' may also be provided to insure alignment of the driver 14 in a direction non-parallel to the rib 34 and flange-like portion 73. In the preferred embodiment this supplemental support surface is formed as a tab 35' from a portion of the cover 13 directly adjacent the driver recessed surface area 33. The tab 35' extends adjacent the open portion 32 of the driven end portion 14b when the mechanism is assembled. This feature helps keep the adjusting assembly in a cooperating, aligned arrangement for optimum operation.

Figure 11:
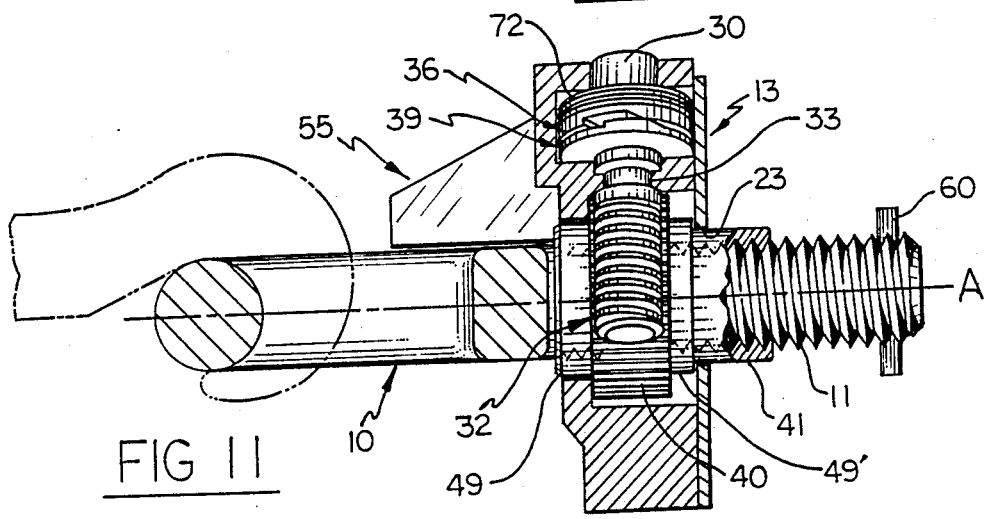
FIG. 11 is a view in cross-section of the assembled preferred embodiment shown in a second adjusted position.

A second part of the adjusting assembly is the drive shaft 15. In the preferred embodiment the drive unit 15 has portions which are substantially circular in shape. On the forward facing side of the drive unit 15 is a boss 49. The boss 49 is of a shape and size which permit its insertion into and containment by the housing through-hole 21. This may provide alignment for the drive unit within the housing. Rearward of the boss and along a periphery of the drive unit is a continuous row of gear teeth 40. The gear teeth 40 form a second meshing surface which is constructed to interact with and engage the meshing surface or threads 32 on the driver 14. Immediately forward of the gear teeth is a surface 43 which functions during operation of the mechanism as a reacting surface against the adjacent housing surface 19a. In FIGS. 10 and 11 it can be appreciated that rearward of the gear teeth 40 is a spacer portion 49' which enhances the stability of the drive unit relative to the housing Cover 13. Rearward of this portion 49' is a boss 41 which fits through the opening 23 in the housing cover 13 and provides the mechanism by which rotational movement of the drive unit 15 may be translated into linear movement, i.e. adjustment, of the connecting element. This portion has a relatively smooth outer wall and a threaded internal wall or through-hole 42 extending the full length of the drive unit. The diameter of the threaded through-hole 42 and of the housing opening 21 are each of a size to permit the threaded portion 11 of the connecting element 10 to pass through the housing opening 21 and be threadably engaged and contained by the drive unit through-hole 42. The outer diameter of the second meshing surface or gear teeth 40 cannot be greater than the diameter of the recessed area 19 in the fixture 12 in order to permit rotation of the drive unit when it is assembled in the housing.

In order that the driver 14 and the drive unit 15 be supplementally restrained from inadvertent rotation after the proper adjustment of the latching mechanism has been accomplished, a spring means 12 may be used. A second recess 50 is formed in the housing 16 immediately adjacent and continuous with the recessed opening 19. A suitable leaf spring 12 having an interrupted surface area or v-shaped portion 52 is formed to interfere with the movement of the drive unit and be positioned between any two adjacent gear teeth 40 on the drive unit meshing surface. The force of the spring is selected to prevent inadvertent rotation of the drive unit and the driver, but it must also permit rotation of the drive unit by an operator when adjustment is desired. Of course, this spring may be deleted in that the clutching and self-locking features of the invention eliminate a primary need for such a spring. For example, selection of the thread or tooth gear angles on the driven end portion 14b and the drive unit 15 may be such that the drive unit 15 cannot back drive the driven end portion 14b. This may then provide a primary locking feature which further eliminates the need for a leaf spring 12.

Figure 12:
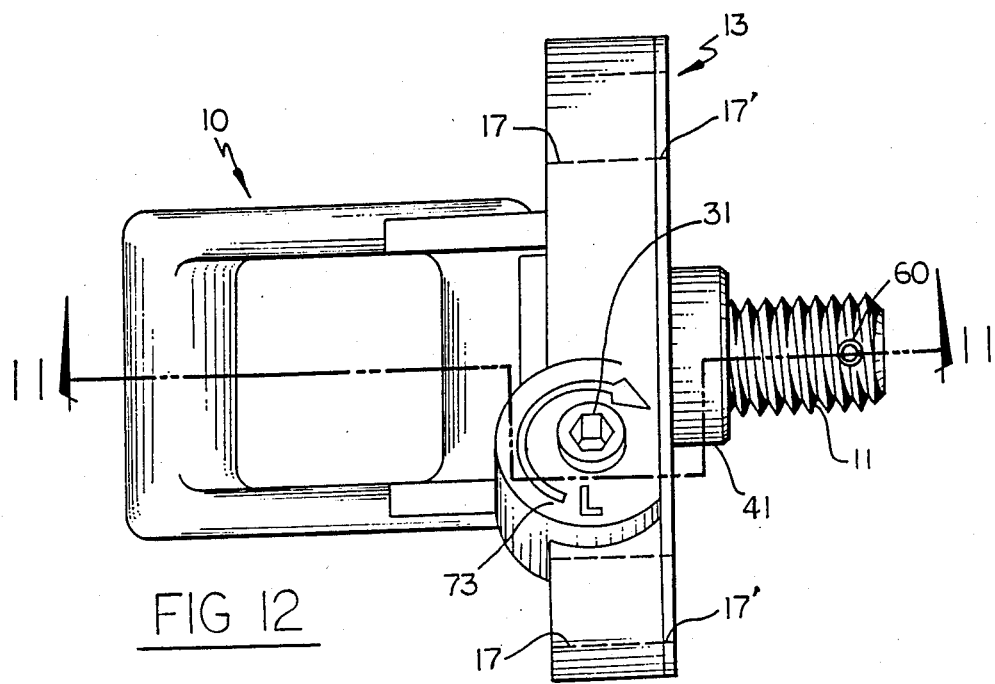
FIG. 12 is a top plan view of the preferred embodiment in assembled form.

A final component of the preferred embodiment is a means by which rotational movement of the connecting element 10 is prevented. In the preferred embodiment this mechanism is constructed separate from the adjusting assembly and the connecting element. In FIGS. 10–12, a rigid shelf 55 is illustrated. It may be formed integral with the housing 16 at a location above the connecting element 10. The rigid shelf 55 includes a pair of fingers or arms 58, 59 which are formed so as to lie directly above the non-threaded portion of the connecting element. The connecting element is prevented from rotation by the rigid arms 58, 59 which are fixed and thereby obstruct rotational movement of the connecting element itself. This component of the invention is constructed as an integral part of the housing 16, i.e. as part of a cast or molded housing. An advantage to this component of the invention over the present state of the art can be appreciated for the following reasons. Current state of the art adjustable keepers are frequently damaged as a result of an operator inserting a tool into the window or opening of the connecting element 10. The operator mistakenly tries to effect preload adjustment of the latching mechanism by turning the connecting element 10 in this manner. The rigid shelf 55 of the present invention not only prevents the operator from rotating the connecting element in this manner, but also provides a visual indication or warning to the operator that the connecting element 10 cannot be rotated in such an improper manner and therefore such should not be attempted.

To assemble the preferred embodiment at the place of manufacture the following steps are taken: The drive unit 15 is first positioned in the major portion 16 of the housing so that the boss 49 is held by the housing opening 21 and the gear teeth 40 are contained within the recess 19. The two-part driver 14 is then positioned in the housing recess 20 so that the threads 32 interact and engage the gear teeth 40 the clutching plates 36, 39 are seated together and the second clutching plate 39 is resting on the rib 34. Of course it must be appreciated that the springs 72 are positioned on the shaft 30 before the driver is placed into the housing. The spring 12 is installed in the recess 50 so that its interrupted surface 52 is positioned between a pair of teeth on the drive unit gear surface 40. The cover plate 13 is then secured to the back of the housing portion 16 by fasteners 18c, with the rearward portion of the drive unit 15 extending through the opening 23 and beyond the cover plate 13. The connecting element threaded portion 11 is then threaded into mating engagement with the inner threads of the drive unit 15. The adjusting assembly is then operated to move the connecting element through the housing. When the connecting element threaded portion II extends beyond the cover 13, a pin 60 may be inserted through a hole 70 in the protruding end of the connecting element to prevent the connecting element from being removed from the assembled latch mechanism. The preferred embodiment is then ready for mounting and use if the housing is intended for mounting behind a structure. Of course, assembly steps may be varied from the foregoing if the end user intends to mount the housing other than behind a structure. A person skilled in the relevant art will readily appreciate this fact and not require additional instructions on how to assemble the invention before mounting it on a structure.

The operation of the invention may be appreciated from a study of FIGS. 10 and 11. In FIG. 10 the connecting element 10, is shown in an extended condition. All linear movement of the connecting element along its axis A is a direct result of rotational movement of the drive unit 15. Movement of the drive unit 15 is effected by rotational movement of the driving end 14a. The driving end may only be operated by a tool (e.g. a conventional allen wrench) being inserted into its free ends 31 e.g. hex head recess. Rotational movement of the driver 14 causes rotational movement of the drive unit 15 as a result of the interacting engagement of the driver threads 32 and the drive unit gear teeth 40. Because the connecting element 10 is restricted from rotating relative to the housing 12 by the shelf 55, the rotational movement of the drive unit 15 is translated into linear movement of the connecting element as the drive unit 15 rotates with the driver 14 and around the connecting element 10. Thus as can be seen in a comparison of FIGS. 10 and 11, as the rotatable element is rotated, in one direction, the element 10 retracts increasing the preload existing in the mechanism and structure at that point. Depending on the direction the driver 14 is rotated at any given time, the connecting element may be adjusted in infinitely small, non-incremental amounts. The selection of the fineness of the threads and gear teeth will accordingly affect the number of turns the tool must complete in order to achieve a specific amount of movement of the connecting element 10.

In the present invention the clutching surface components or plates 36, 39 in combination with the springs 72 prevent the drive system from effecting adjustment beyond a predetermined load. The upper clutching plate 36 engages the lower clutching plate 39 as a result of the force of the springs 72 which bias the plate 36 against the other plate 39. Rotation of the driving end 14a thus causes simultaneous rotation of the driven end 14b because of the seating of the raised surfaces 38, 39b within the recessed surfaces 39c, 39 respectively. Rotation of the driven end 14b causes simultaneous rotation of the drive unit 15. Accordingly, rotation of the driven unit 15 is translated into axial or linear movement of the connecting element 10. The direction of rotation is such as to cause the connecting element 10 to move axially in a direction away from the stationary element, e.g. hook, to which it is latched, thereby increasingly adjusting the tension load between the two elements. All the while, the springs 72 continue to bias the clutching plates 36, 39 against each other. Rotation of the drive system 14a, 14b, 15 thus continues until the input torque of the drive system required to achieve the predetermined pre-load between the two elements, e.g. hook and keeper, equals the torque required to override the spring force or load biasing the clutching plates together. When this equalizing occurs, the clutching plate 36 will move out of engagement with the other clutching plate 39 by virtue of the mating ramp surfaces 36a, 36b, 36c, 39a, and the springs 72 flatten to accommodate this movement of the upper clutching plate 36. See FIG. 11. The mechanism then clutches out when the output torque required to move or adjust the connecting element exceeds the input torque permitted by the clutching assembly. Immediately the operator will know that this has occurred by the sound and feel of the clutching plate 36 moving freely over and along the clutching plate 39 without effecting any further adjustment of the connecting element. Continued rotation of the driving end 14a is ineffective in rotating the drive unit 15 as a result of the disengaged clutching plates.

When it is desired to adjust or lessen the tension load between the connecting element and the hook, reverse rotation of the drive system is possible because of the mating vertical surfaces 36d, 36e, 36f, 39a' on the two plates 36, 39.

The primary advantages of the invention may now be appreciated. The driver of the present invention permits the user to mount the latching mechanism at a wider range of depths relative to the exterior of the structures joined by the latching mechanism, i.e. engine cowl. This is not possible with the conventional star-wheel constructions where the adjusting assembly must be mounted close to the access opening in the structure in order to permit the insertion of a tool into the structures in order to effect the adjustment of such star-wheel mechanisms. That is, if a conventional star-wheel type latching mechanism is mounted too deep or too far below the access opening in the structure surface, its adjustment will not be possible as any tool will be limited in its movement with respect to the access opening and accordingly the star-wheel cannot be rotated. In the present invention this problem will not occur as the driver shaft may be designed to whatever length necessary without loss of any adjustment capability. The driver recess will remain at the access opening and can be kept at a particular size regardless of the length of the shaft portion 30 of the driver end portion 14a which is required to reach the depth at which the adjusting assembly is positioned.

Further, the use of the clutching plates automatically stops the operator from overloading the latch assembly or surrounding structure, thereby preventing the operator from causing serious damage to the structure if overloaded. The construction of the invention provides a simple load path, i.e. the drive unit and driver meshing surfaces and the clutching system bypass the load line A of the connecting element and latch. And depending upon the gear ratio between the meshing surfaces 32, 40, the input torque required to rotate the drive system may be relatively low compared to other types of adjustable latching mechanisms. This aspect of the invention provides a significant advantage in that the mechanical advantage resulting from this design reduces the torque required from the operator in order to rotate the drive system when the keeper is under a load relative to the stationary element, i.e. hook.

In view of the foregoing it should be clear that the invention affords advantages and a degree of flexibility in design which is not provided by any known prior art drive. Other embodiments for the invention from that shown in the drawings may be possible to persons skilled in this art field. For example, another embodiment of the invention could use clutch plates which are constructed so as to disengage in both directions when the desired preload adjustment is obtained. Accordingly, reverse rotation of the tool would not reduce nor increase the preload adjustment. This type of embodiment may be desirable to prevent inadvertent loosening of the preload adjustment as a result of the operator rotating the tool in the wrong direction. Accordingly, the scope of the protection for this invention is believed limited only by the claims which follow.

What is claimed is:

1. An adjustable keeper mechanism constructed and arranged for securing a first structure relative to a second structure under a pre-selected load, said mechanism comprising:

a connecting element, having a longitudinal axis, structurally secured to said first structure and arranged for joining said first structure to said second structure;

an assembly for adjusting the position of and load on said connecting element along its longitudinal axis relative to the structures;

said assembly including a driver and a drive unit;

said driver having a tool operable first driving end portion with a first clutch surface at one end thereof and a second driven end portion with a second clutch surface at one end thereof, said first and second clutch surfaces normally engaging one another until a pre-selected load causes separation thereof;

said second driven end portion of said driver having a first meshing surface formed on its end opposite said second clutch surface and said drive unit having a second meshing surface formed thereon for translating rotational movement of said driver through said first driving end portion, said first and second clutch surfaces, and said second driven end portion to said drive unit; and said drive unit receiving said connecting element for translating rotational movement of said drive unit into linear movement of said connecting element along its longitudinal axis until said pre-selected load is exceeded whereby said clutch will cause said first and second portions to disengage.

2. The adjustable keeper mechanism of claim 1, additionally comprising:

said connecting element having a threaded portion extending along its longitudinal axis;

said drive unit having internal threads for receiving said threaded portion of said connecting element; and said driver positioned off axis from said longitudinal axis of said connecting element within said assembly.

3. The adjustable keeper mechanism of claim 1, additionally comprising:

spring means for urging said first and second clutch surfaces into said engagement; and said pair of clutch surfaces having means for retaining said surfaces in alignment after disengagement of said surfaces.

4. The adjustable keeper mechanism of claim 1, wherein:

said first and second portions of said driver form a shaft having a length predetermined by the depth at which said adjustable keeper mechanism is mounted from the exterior surface of said structures, permitting the mounting of said mechanism over a range of depths within said first and second structures.

5. The adjustable keeper mechanism of claim 1, wherein:

a load, established between said first and second structures, is carried along a load path including said connecting element and said driver unit, with said driver being positioned outside said load path.

6. The adjustable keeper mechanism of claim 1, further comprising:

a housing for mounting said drive unit to receive said connecting element along the longitudinal axis of said connecting element and for mounting said first and second end portions of said driver to bypass said longitudinal axis.

7. The adjustable keeper mechanism of claim 1, further comprising:

means for preventing rotational movement of said connecting element as said element is adjusted along its longitudinal axis during rotation of said drive unit.

8. An adjustable keeper mechanism for joining a first structure to a second structure, comprising:

a keeper having a threaded portion extending longitudinally along an axis thereof;

a drive unit for threadably receiving said threaded portion of said keeper, said drive unit having an outer periphery provided with gear teeth thereon;

a driver having a driving end portion with a first clutch surface on one end thereof and a driven end portion with a second clutch surface on one end thereof, said driving end portion thus separated by a clutch from said driven end portion, said driven end portion having gear threads formed on its second end opposite from said second clutch surface for engaging said gear teeth upon said drive unit; and a housing for mounting said driving end portion and said driven end portion of said driver and said drive unit such that rotation of said driver rotates said drive unit for imparting a linear motion to said keeper along its axis while said clutch limits said linear motion and the load that may be placed upon said keeper by said driver.

9. The adjustable keeper mechanism of claim 8, wherein:

said driving end portion and said driven end portion of said driver form a two-piece shaft, and a tool operable, free end formed in said driving end portion at the exterior surface of one of said structures.

10. The adjustable keeper mechanism of claim 8, wherein:

said driver is a shaft having a length predetermined by the depth at which said mechanism is mounted from the exterior surface of said first and second structures, permitting the mounting of said adjustable keeper mechanism over a range of depths within said first and second structures.

11. The adjustable keeper mechanism of claim 8, wherein:

said driver is mounted within said housing to bypass said loading created by the joining of said first and second structures.

12. The adjustable keeper mechanism of claim, further comprising:

a shelf extending from said housing for preventing rotational movement of said connecting element as said element is adjusted along its longtudinal axis during rotation of said drive unit.

13. The adjustable keeper mechanism of clay 8, further comprising:

bias springs for urging said clutch separating said driving end portion and driven end portion into engagement until said load on said keeper exceeds a pre-selected level.

14. The adjustable keeper mechanism of claim 8, wherein:

said gear threads of said driver and said gear teeth of said drive unit present said drive unit from back driving said driver.

15. The adjustable keeper mechanism of claim 8, additionally comprising:

said housing having a slot therein that communicates with said gear teeth on said drive unit; and a spring mounted in said slot for engaging said gear teeth on said drive unit to inhibit rotation thereof.

16. The adjustable keeper mechanism of claim 8, additionally comprising:

said driver mounted within said housing to the side of said drive unit to bypass and loading created by the joining of said first and second structures.

17. An adjustable keeper mechanism for joining a first structure to a second structure under a pre-selected load, comprising:

a keeper having a threaded portion extending longitudinally along an axis thereof;

a drive unit for threadably receiving said threaded portion of said keeper, said drive unit having an outer periphery provided with gear teeth thereon;

a driver having a driving end portion with a first clutch surface on one end thereof and a driven end portion with a second clutch surface on one end thereof, said driving end portion thus separated by a clutch from said driven end portion, said driven end portion having gear threads formed on its second end opposite said second clutch surface for engaging said gear teeth upon said drive unit;

a housing for mounting said drive unit and the driving end portion and driven end portion of said driver such that rotation of said driver rotates said drive unit for imparting a linear motion to said keeper while said clutch limits said linear motion and the load that may be placed upon said keeper by said driver to said pre-selected load; and said housing mounting said driver to bypass said load created by the joining of said first and second structure.

18. An adjustable keeper mechanism of claim 17, additionally comprising:

a shelf mounted upon said housing for preventing rotational movement of said keeper during the linear motion thereof.

* * * * *